Oct. 3, 1972 — W. C. G. ORTEL — 3,695,875
CONTRAST IN COMPUTER GENERATED PHOTOETCHING MASKS
Filed Oct. 27, 1970 — 2 Sheets-Sheet 1

INVENTOR
W. C. G. ORTEL
BY
ATTORNEY

– – –

United States Patent Office 3,695,875
Patented Oct. 3, 1972

3,695,875
CONTRAST IN COMPUTER GENERATED PHOTOETCHING MASKS
William Charles Gormley Ortel, New York, N.Y., assignor to Bell Telephone Laboratories, Incorporated, Murray Hill and Berkeley Heights, N.J.
Filed Oct. 27, 1970, Ser. No. 84,433
Int. Cl. G03c 5/04, 5/00
U.S. Cl. 96—27      4 Claims

ABSTRACT OF THE DISCLOSURE

A method for producing high contrast photographic images. From the low contrast original, a first copy is made on high contrast film, thereby reversing the image. Exposure time is controlled in order to underexpose the lightest areas which should have been opaque in the original. From this copy, a second copy is made on high contrast film, again reversing the image. Again, the lightest areas of the first copy which should have been opaque are underexposed by controlling the exposure time. These areas correspond to the darkest areas in the original transparency which should have been light. By correctly controlling the exposure times of these two steps, a transparency is produced with nearly binary density scale, thus producing a high contrast mask suitable for photoetching.

BACKGROUND OF THE INVENTION

(1) Field of the invention

This invention relates to photographic arts and particularly to photographic processes for intensifying the photographic image.

(2) Description of the prior art

A digital computer may be provided with a microfilm plotter for directly producing photographs from a CRT (cathode ray tube) image. Plotted images are customarily line graphs, simple line drawings, and so forth. One device suitable for this is the SC4060 manufactured by Stromberg-Carlson Corporation. See "The Growth of Computer Graphics at Bell Laboratories," Bell Laboratories Record, June 1968, by W. H. Ninke.

In an extended application, the SC4060 may be used to produce masks suitable for photoetching purposes. Such masks may be used for the fabrication of printed circuits or integrated circuit devices. See for example "Computer Generates Thin-Film Circuit Masks" by W. Worobey in the Bell Laboratories Record, May 1968. Circuit masks are characterized by relatively large filled-in areas which are built up by successive narrow trace lines. These narrow lines are preferably arranged to closely parallel one another so that the resulting photographic image gives a solid filled-in area. However, on close inspection, it is found that the slight separation between the lines on the cathode ray oscilloscope shows up as dark irregularities in the photographic image.

Another application to which use of the SC4060 has been extended is the production of halftone images. A grid of 1,024 by 1,024 points is available as locations for the rest point of the electron beam. In order to create halftone images, the dot size at each of these raster locations is controlled by controlling the intensity of the electron beam. Visual inspection of film produced by this method shows good grey scale reproduction. However, the film is not suitable for direct use as a photoetching mask. Across the width of the projected dot there is a continuous distribution of brightness. The exposed film shows a similar continuous distribution of film density across the face of the dot appearing in the microfilm record.

In each of these applications, printed circuit masks and halftone dot generation, best results are obtained from the photoetching process if the mask has a binary density scale. That is, the transparent areas of the mask should preferably be quite clear, and the dark areas should be quite opaque, thereby producing a high contrast image. The area between successive traces in the filled-in area of a circuit mask, however, does not produce the same film density as at the center of the trace. And the area near the edge of the halftone do does not have the same density as the center of the dot.

These irregularities are even more pronounced when the original mask is made with a reversal-type photographic process. The reversal process (usually carried out with special reversal film) creates a positive transparency. That is, exposed areas become transparent, and unexposed areas become opaque. It is characteristic of reversal processing to produce a low contrast image, so that the resulting photoetching mask needs contrast intensification.

The intensification process to be applied preferably results in a very great increase in contrast. Also preferably, the process can be closely controlled to virtually eliminate the continuous distribution of film density appearing between successive traces and across dot faces. The present inventive process meets these requirements.

SUMMARY OF THE INVENTION

In order to overcome photographic irregularities in the microfilm record, which arise from a continuous distribution of film density when the desired image is binary, a two-step photographic process is employed in which the image is twice copied on high contrast film. By closely controlling the exposures, the "toe" of the "H & D" curve is utilized in order to underexpose areas of the film containing both light and dark irregularities in the original. The H & D curve is a log-log plot of film density versus the exposure time needed to produce the plotted density.

Since each copying step reverses the photographic image, the first copy is used to underexpose the lightest areas which should have been dark in the original. The second copy is used to underexpose the lightest areas which should be dark in the first copy, i.e., the darkest areas which should have been light in the original.

In this fashion, a "slicing" effect is achieved in the density if the original image. All areas having a density less than the slicing level become almost uniformly transparent in the second copy. All areas with densities greater than the slicing level are nearly uniformly opaque in the second copy. Therefore, nearly binary values of density levels are achieved in the second copy resulting in greatly increased contrast and an image wherein the irregularities have been virtually eliminated. This and other characteristics of the process herein described will become more apparent from the following description of the drawings.

DETAILED DESCRIPTION

Figure 1:
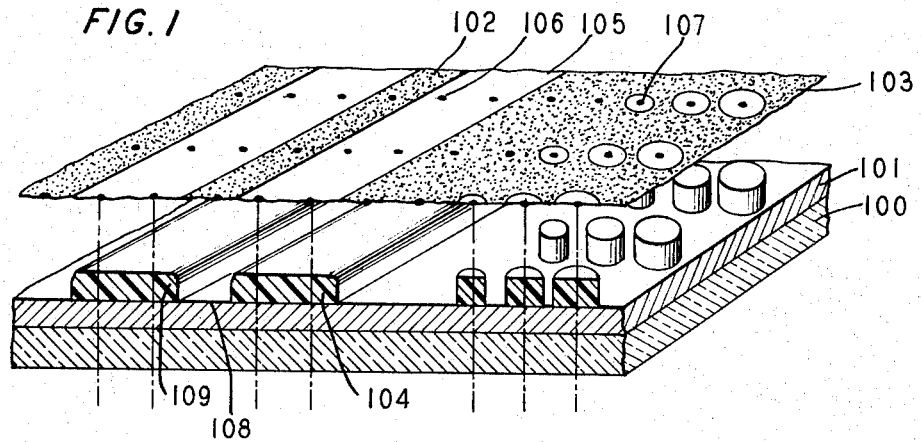
FIG. 1 shows a photoetching mask in its relationship to an etchable substrate.

The photoetching process that is used to produce integrated circuits, printed circuit boards, and photoengraved printing plates employs a chemical etchant to remove a thin surface layer of material from a substrate. Such a process is well known prior art. See, for example, Chapter 10 of Thin Film Technology by Berry, Hall and Harris (D. Van Nostrand, 1968). FIG. 1 shows substrate 100 ready for the etching step which will remove unprotected portions 108 of the surface layer 101. Portions of layer 101 not to be etched away are protected by a pattern of protective photoresist 104.

In a prior step, layer 101 was coated by a uniform layer of photoresist. A portion of photoresist 104 was polymerized and hardened by exposure to ultra-violet radiation passing through transparent area 105 of film pattern mask 103 in a step such as contact printing. Opaque area 102 of film mask 103 blocked the ultra-violet and prevented the photoresist thereunder from being hardened. The unhardened photoresist was washed away with a suitable solvent leaving area 108 exposed. For reference purposes mask 103 has superimposed thereon points representative of the 1,024 by 1,024 raster locations on the face of the CRT which was photographed to produce mask 103. The film at point 106 was exposed by a line trace passing over the point. Two such traces made parallel one raster unit apart have created the complete exposed area 105.

The photoresist which remains at 104 will protect from etchant an area to become a strip of material 101 which may be conductive. The area at 109 will protect a parallel conducting strip. A narrow space at 108 will appear between them.

Film at point 107 was exposed by a momentary rest of the CRT beam. Either intensity or rest time may be increased to increase the apparent diameter of the exposed dot thus produced. With a suitable layer 101, a surface suitable for halftone lithography may be produced. A collection of etched dots will produce a grey value dependent on dot size.

It has been so far assumed that mask 103 is of high contrast with a binary value of film density: that is, transparent areas are uniformly so, and opaque areas are uniformly quite dark. Density in this context is defined as the ratio of the incident light to the transmitted light: that is, the greater the density, the more opaque the film. The ideal conditions assumed for mask 103 represent a goal to be approached by the methods herein taught.

Figure 2:
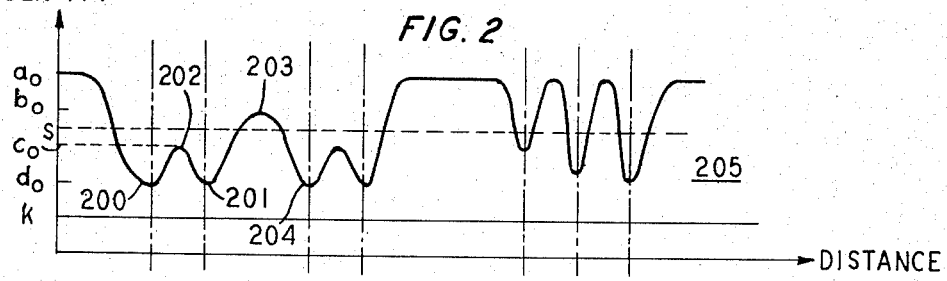
FIG. 2 shows a density profile of a mask like that of FIG. 1 but with insufficient contrast.

FIG. 2 illustrates a density profile of a more realistic mask produced by a CRT photograph on reversal film intended to produce the mask shown at 103. Various irregularities can be seen in the profile of FIG. 2. The density "troughs" at 200 and 201 represent the minimum density $d_0$ obtained after exposure of microfilm to the oscilloscope image in this example. Peak 202 represents a slight increase in film density $c_0$ which occurs between adjacent traces of the electron beam. Beam overlap was not sufficient to fully expose the film between the traces. Peak 202 is a dark irregularity which appears in a transparent area and should be removed.

Peak 203 is intended to be an opaque area. However, because of the proximity of troughs 201 and 204, halation and other effects, the film is partially exposed reducing the density at peak 203 to the value $b_0$. Peak 203 is therefore a light irregularity appearing in a dark area of preferred density $a_0$.

Troughs 205 demonstrate a transparency dependent on the exposure of the individual dots on the CRT face. Preferably, only the diameter of the various dots should vary while the transparency is uniform across each dot face.

Minimum film density $k$ is shown in the figure which represents the so-called background density of the film. Background is caused by the light absorption of the transparent film itself, free of the effects of any emulsion, and therefore represents a lower density bound.

Figure 5:
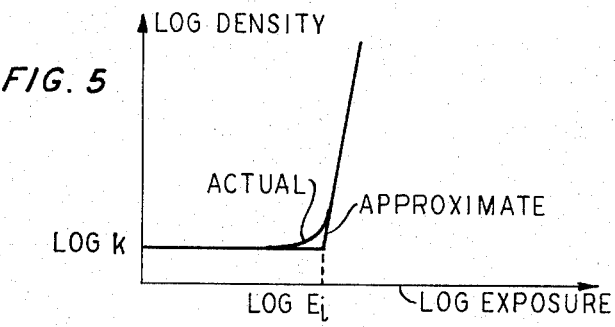
FIG. 5 is an H & D curve describing the emulsion characteristics of a high contrast film suitable for the double copying steps of FIGS. 3 and 4.

In order to produce a mask with more nearly binary densities from the computer-drawn original in FIG. 2, two copies are made in sequence on high contrast film which has a relationship between density and exposure similar to that shown in FIG. 5. This characteristic curve is commonly called the "H & D" curve. For high contrast film, the H & D curve is extremely non-linear at the horizontal "toe" and is fairly accurately represented by the two straight lines on log-log plot of FIG. 5. The horizontal line represents the background density $k$ of unexposed film. The slanted portion of the curve is a power law increase of density for exposures that exceed the exposure $E_i$. The value $E_i$ is termed the film inertia, and to a first approximation only exposures greater than $E_i$ cause any darkening of film emulsion at all. In practice, of course, there is some slight darkening at exposures less than $E_i$.

Figure 3:
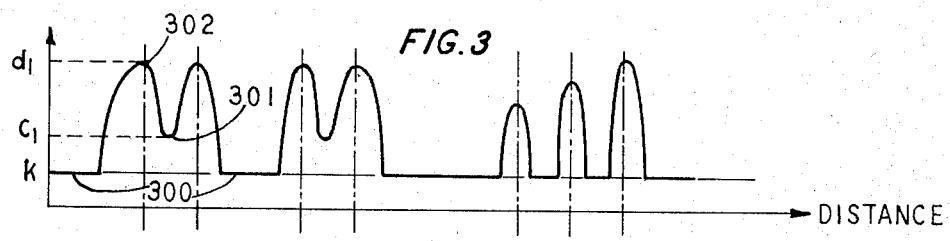
FIG. 3 represents a first copy of the mask of FIG. 2.

When high contrast film such as that described by the curve of FIG. 5 is exposed through an original transparency as shown in FIG. 2 with a short enough exposure time, the result is as shown in FIG. 3. Portions of the original having densities $a_0$ or $b_0$ which are shades of black and grey, respectively, are arranged to have only background density $k$ as shown at 300 in the copy of FIG. 3 and thus be equally transparent. In order to accomplish this, a densitometer measurement is made of the lightest area of the film of FIG. 2 which is intended to be dark, i.e., $b_0$ at 203. An exposure time is then chosen which underexposes the selected area, that is, which causes exposure of the selected area to be below $E_i$.

In this copy, any differences in density within the relatively transparent portions of the original are greatly amplified. This is due to the rather steep slope of the H & D curve for exposures greater than $E_i$. Thus in FIG. 3, there are distinct dark areas of density $d_1$ separated by grey regions of density $c_1$ as shown at 302 and 301, respectively, corresponding to portions of the original of the densities $d_0$ and $c_0$, respectively.

Figure 4:
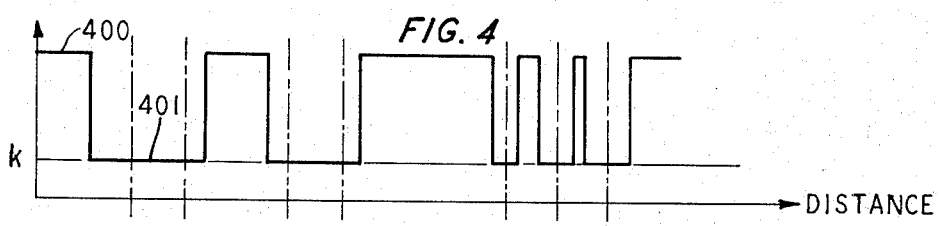
FIG. 4 represents asecond copy derived from the mask of FIG. 3 which is suitable for use in the photoetching process of FIG. 1.

FIG. 4 illustrates a second copy also made from high contrast film which may or may not be made with the same type film. Now the density of the lightest area of the film of FIG. 3, the first copy, which should be dark is determined with a densitometer, i.e., $c_1$ at 301. An exposure time is now chosen—which generally will be different than that for the first copy—which underexposes the areas selected in the first copy.

When the second film is exposed properly through the first copy, regions with density $d_1$ and $c_1$ are underexposed. Background density $k$ will extend throughout regions intended to be filled-in and transparent as at 401. The second copy will receive a uniform exposure and be uniformly dark elsewhere as shown at 400.

Figure 6:
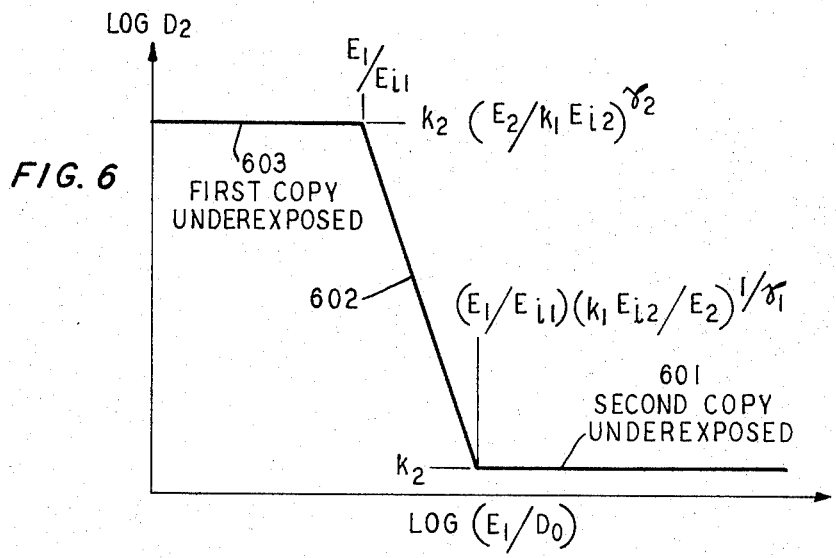
FIG. 6 is a composite H & D curve.

The combined effect of the two exposures in converting the original of FIG. 2 to the second copy of FIG. 4 may be represented by a single transfer function as in FIG. 6, that is a composite of two FIG. 5 H & D curves and constitutes a nearly ideal "slicing" function. The basic model describing FIG. 5 is:

$$\left. \begin{array}{l} D = k(E/E_i)^\gamma \text{ for } E > E_i \\ D = k \quad\quad\quad\quad \text{ for } E < E_i \end{array} \right\} \quad (1)$$

Where D is the density of the film, $k$ is background density, E is the exposure used, $E_i$ is the film inertia, and $\gamma$ is the exponential amplification factor which is much greater than one for high contrast film. Also, it should be noted that exposure through a film area of density D reduces the exposure E to the value $E/D$.

It is interesting to derive the function of FIG. 6 from the simple model shown in FIG. 5, using different parameters (denoted by subscripts 1 and 2) for the first and second copying steps so that the function may be used for analysis. The function of FIG. 6 has a region 603 in which the first copy is underexposed, producing density $D_1=k_1$ whatever the original density $D_0$. This will produce a final density $$D_2 = k_2(E_2/k_1 E_{12})^{\gamma_2} \quad (2)$$

This region ends at the toe of the first curve where $$E_1/D_0 = E_{11}$$

or $$D_0 = E_1/E_{11} \quad (3)$$

In region 601, the second copy is underexposed, with density $D_2=k_2$. The boundary of this region is where $$E_2/D_1 = E_{12}$$

or $$E_2/k_1(E_1/D_0 E_{11})^{\gamma_1} = E_{12}$$

or $$D_0 = (E_1/E_{11})(k_1 E_{12}/E_2)^{1/\gamma_1} \quad (4)$$

The greatest possible ratio of densities in the second copy is thus $(E_2/k_1 E_{12})^{\gamma_2}$. In the transition region 602, neither copy is underexposed, and $$D_2 = k_2(E_2/D_1 E_{12})^{\gamma_2}$$
$$= k_2(E_2/k_1 E_{12})^{\gamma_2}(D_0 E_{11}/E_1)^{\gamma_1 \gamma_2} \quad (5)$$

Small variations of original density within this region are thus amplified in the second copy by a power law with exponent $\gamma_1 \gamma_2$.

The transfer function that has been derived from the ideal model has features which are affected independently by $E_1$ and $E_2$. The former determines the "slicing level," which is the original density that is necessary to produce maximum density in the second copy, while the latter determines both maximum contrast in the second copy and the minimum original contrast that is necessary to obtain that maximum.

The analysis of two-step copying that is given above may be applied to answer two practical questions: First, what original contrast is needed for successful intensification? Second, what exposure times should be used with specified original densities? There will, in practice, be a range of original densities $b_0$ and $c_0$ as well as variations in the film parameters $k$ and $\gamma$ that characterize actual film and actual processing routines. FIG. 5 indicates the extent to which the toes of the real curves are rounded. The effect of rounding may be accounted for by using an additional parameter, $f$, defined as $E_s/E_i$, where $E_s$ is the "safe" exposure which will be sure to produce only background density.

The significant parameters that constrain the exposures are:

$b_0$ min.—The smallest density in regions of the original pattern which should be black.
$c_0$ max.—The greatest density in filled-in areas of the original pattern, which should be transparent.
$b_2$ max.—The greatest density required in black areas of the mask.
$k_{min}$ and $k_{max}$.—The smallest and greatest background densities.
$E_1$ min. and $E_1$ max.—The smallest and greatest breakpoints of the idealized curves fitted to real film characteristics.
$f_{min}$.—The smallest fraction needed to allow for the rounded toe of a real film characteristic.
$\gamma_{min}$.—The smallest exponent needed to fit the idealized model to a real film characteristic.

The first three parameters are properties of the original film, the others depend on the copying film and process.

There are three fundamental inequalities that must be satisfied by these parameters. The slicing levels of the transfer function must be properly placed:

$$b_0 \text{ min} > E_1/E_1 \text{ min} f_{min} \quad (6)$$

$$c_0 \text{ max} < (E_1/E_1 \text{ max})(f_{min} k_{min} E_1 \text{ min}/E_2)^{1/\gamma_{min}} \quad (7)$$

The process must result in sufficient contrast:

$$b_2 \text{ max} < k_{min}(E_2/k_{max} E_1 \text{ max})^{\gamma_{min}} \quad (8)$$

The marginal condition that all three inequalities are just satisfied is:

$$b_0 \text{ min}/c_0 \text{ max}/K(b_2 \text{ max}/k_{min})^{1/\gamma_{min}^2} \quad (9)$$

where $$K = (k_{max} k_{min})^{1/\gamma_{min}}(E_1 \text{ max}/f_{min} E_1 \text{ min})^{(1+\gamma_{min})/\gamma_{min}}$$

Figure 7:
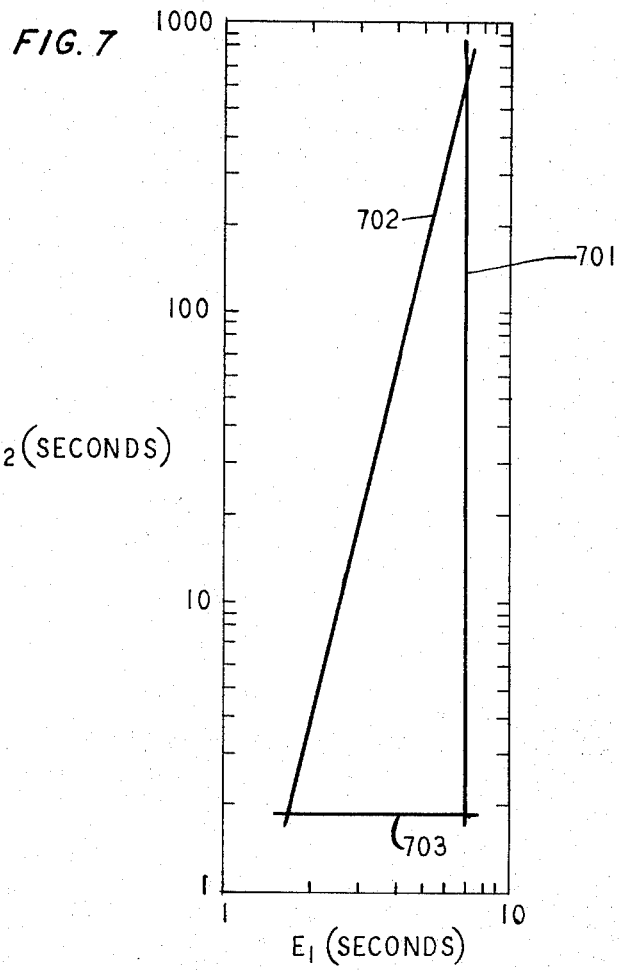
FIG. 7 is a plot of "allowed" exposure times.

The choice of exposure times to be used is facilitated by picturing the inequalities (6), (7) and (8) as defining boundaries on a plot of $E_1$ versus $E_2$. In order for all three conditions to be satisfied at once, the boundaries must be arranged as shown in FIG. 7 with an interior triangular "allowed" region. Inequalities (6), (7) and (8) provide boundaries 701, 702, and 703, respectively. For the marginal condition indicated by equation 9, the triangular region becomes a single point, but, more generally, $E_1$ and $E_2$ are not uniquely determined. In that case, it is desirable to choose $E_1$ so as to make inequality (6) as unequal as possible in order to keep the dark strips between filled-in areas as wide as possible. In FIG. 7, this condition is represented by the corner of the allowed triangle between boundaries 702 and 703. At this corner we have:

$$E_2 = k_{max} E_1 \text{ max}(b_2 \text{ max}/k_{min})^{1/\gamma_{min}} \quad (10)$$

$$E_1 = c_0 \text{ max} GH \quad (11)$$

where $$G = E_1 \text{ max}^{(1+\gamma_{min})/\gamma_{min}}(k_{max}/f_{min} k_{min} E_1 \text{ min})^{1/\gamma_{min}}$$

$$H = (b_2 \text{ max}/k_{min})^{1/\gamma_{min}^2}$$

In a particular example of the use of this process, a number of samples of high contrast film sold under the trade name Orth–3, manufactured by Eastman-Kodak Corporation were processed with normal darkroom procedures and no unusual precautions in exposure or development. For this sample of film, the following approximate maximum and minimum values were obtained:

$k_{min} = 1.20$
$k_{max} = 1.26$
$E_1 \text{ min} = 0.20$ second
$E_1 \text{ max} = 0.30$ second
$f_{min} = 0.42$
$\gamma_{min} = 4.17$ The results of plotting inequalities (6), (7) and (8) for these values are shown in FIG. 7. For this example, exposure values of $E_1 = 2$ seconds and $E_2 = 2$ seconds may be read directly from FIG. 7. Different maximum and minimum values will be produced for different film types and for darkroom processing routines which vary from that used to derive the above data. The exact values shown in FIG. 7 will not apply in that case, but suitable values for $E_1$ and $E_2$ may be found by applying the methods taught herein.

What is claimed is:
1. The method comprising the steps of:
photographically copying a first image from a first film onto a second film wherein portions of said first image are exposed with an exposure less than the value of the inertia of said second film,
photographically copying said second image from said second film onto a third film wherein portions of said second image are exposed with an exposure less than the value of the inertia of said third film.
2. The method of producing a photographic image with two visual states from a first film image having light irregularities in dark areas of said first image and dark irregularities in light areas of said first image, comprising the steps of:

photographically copying said first image by:
  exposing a second film to said first image, wherein such exposure is insufficient to copy said light irregularities, whereby a second image is produced,
  developing said second image, whereby said dark irregularities in said first image become light irregularities in said second image,
 photographically copying said second image by:
  exposing a third film to said second image, wherein such exposure is insufficient to copy said light irregularities in said second image, whereby a third image is produced, and
  developing said third image.

3. The method comprising the steps of:
photographically copying a first image from a first film having at least one first irregularity of density $D_1$ and at least one second irregularity onto a second film having an inertia of $E_{i1}$ wherein the general exposure $E_1$ is chosen such that $E_1/D_1 < E_{i1}$ thereby producing a second image on said second film and
photographically copying said second image from said second film wherein said second irregularity is of density $D_2$ onto a third film having an inertia of $E_{i2}$ wherein the general exposure $E_2$ is chosen such that $E_2/D_2 < E_{i2}$.

4. The method of producing a photographic image with at least one area of density $b_{2\ max}$ comprising the steps of:
photographically copying a first image from a first film having at least one area of density $b_{0\ min}$ and at least one area of density $c_{0\ max}$ with a general exposure of $E_1$ onto a second film, thereby producing a second image and
photographically copying said second image onto a third film with a general exposure of $E_2$
wherein $E_1$ and $E_2$ are chosen to satisfy the inequalities:

$$b_{0\ min} > E_1/E_{1\ min}f_{min}$$
$$c_{0\ max} < (E_1/E_{1\ max})(f_{min}k_{min}E_{1\ min}/E_2)^{1/\gamma_{min}}$$

and $$b_{2max} < k_{min}(E_2/k_{max}E_{1\ max})^{\gamma_{min}}$$

where
$b_{0\ min}$ = minimum density appearing in black areas of the first film
$c_{0\ max}$ = maximum density appearing in transparent areas of the second film
$b_{2\ max}$ = maximum density required in black areas of the third film,
$k_{min}, k_{max}$ = minimum and maximum background densities of the second and third films,
$E_{1\ min}, E_{1\ max}$ = minimum and amximum inertias of the second and third films,
$f_{min}$ = minimum fraction $E_s/E_1$ where $E_s$ is an exposure value which will produce no darkening of the second and third films when the inertia of the second and third films is $E_1$
$\gamma_{min}$ = minimum contrast amplification factor of the second and third films.

References Cited

UNITED STATES PATENTS

| | | | |
|---|---|---|---|
| 957,596 | 5/1910 | Bassist | 96—27 |
| 2,737,457 | 3/1956 | Childres | 96—274 |

FOREIGN PATENTS

| | | | |
|---|---|---|---|
| 453,644 | 9/1936 | Great Britain | 96—27 |

OTHER REFERENCES

Kodak Data Book Q-1, "Basic Photog for The Graphic Arts" (1963), pp. 15–16.
Ilford Manual of Photog, 5th Ed. (1958), pp. 239–242.
Reproductions Review, October 1964, pp. 36–38.

NORMAN G. TORCHIN, Primary Examiner

M. F. KELLEY, Assistant Examiner

U.S. Cl. X.R.
96—27 E, 36.2